June 28, 1949. G. W. SMITH, JR 2,474,640
VEHICLE TRACTION DEVICE
Filed Aug. 1, 1946 4 Sheets-Sheet 1
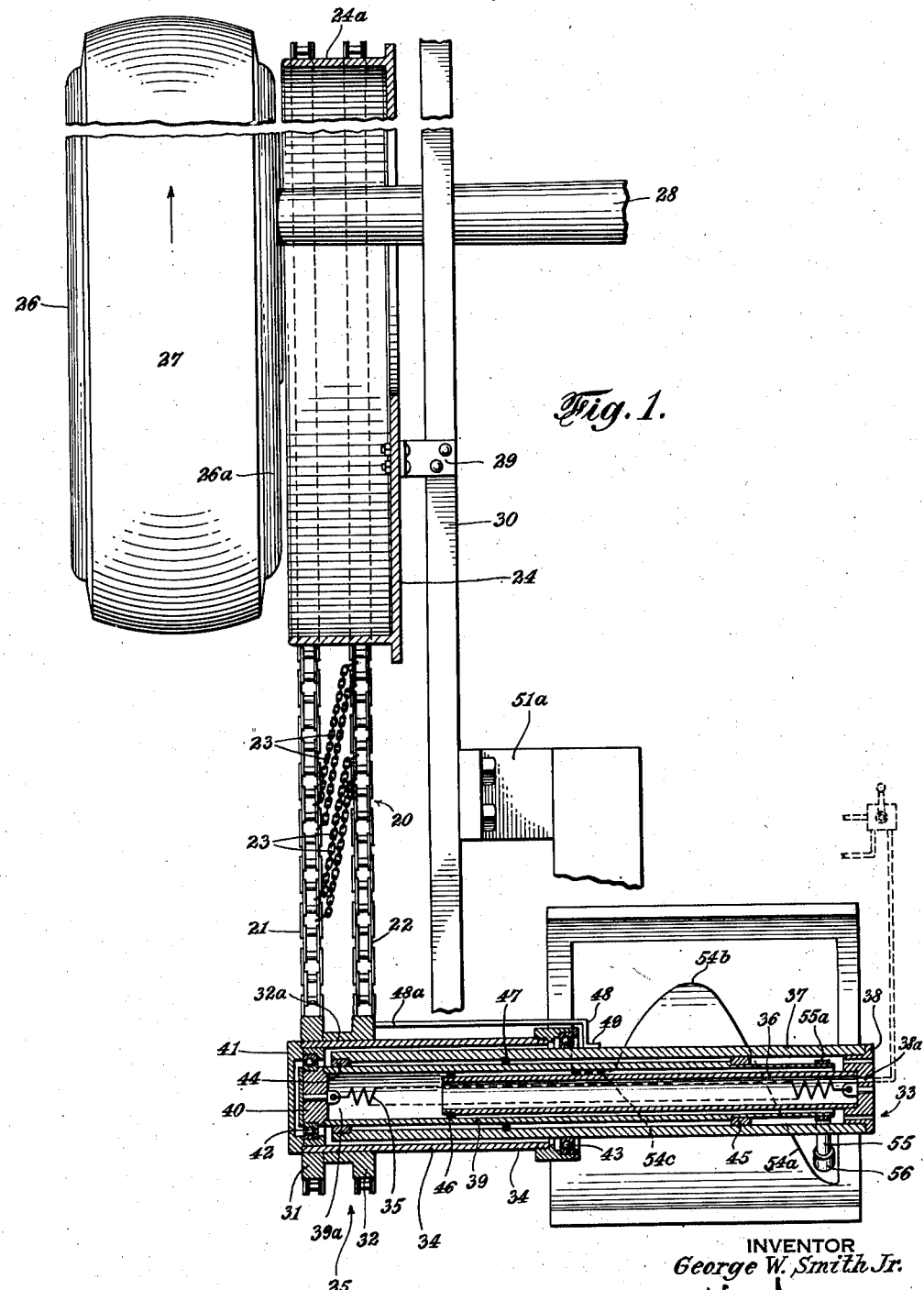
INVENTOR
*George W. Smith Jr.*
BY
ATTORNEY

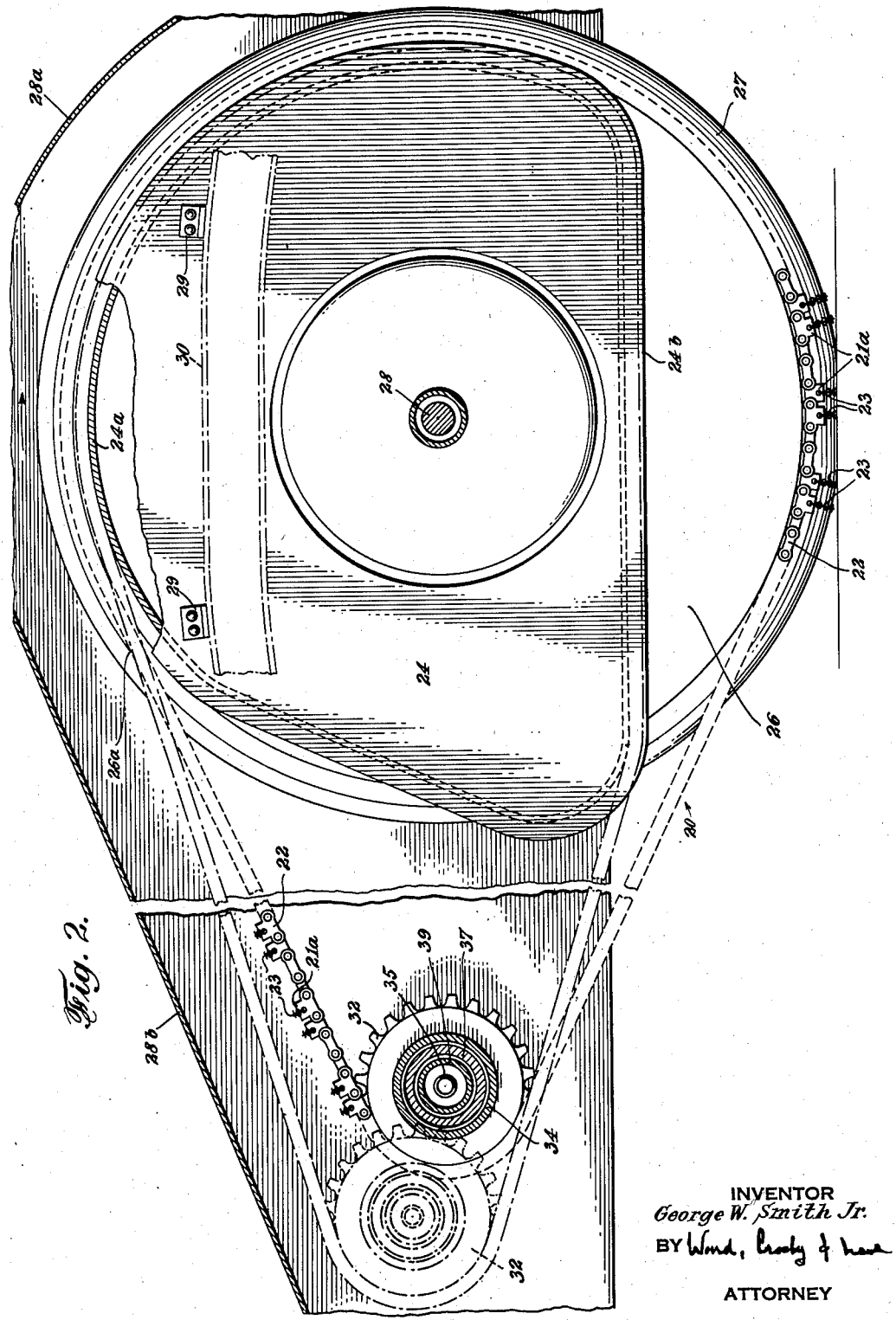

June 28, 1949.  G. W. SMITH, JR  2,474,640
VEHICLE TRACTION DEVICE
Filed Aug. 1, 1946  4 Sheets-Sheet 3
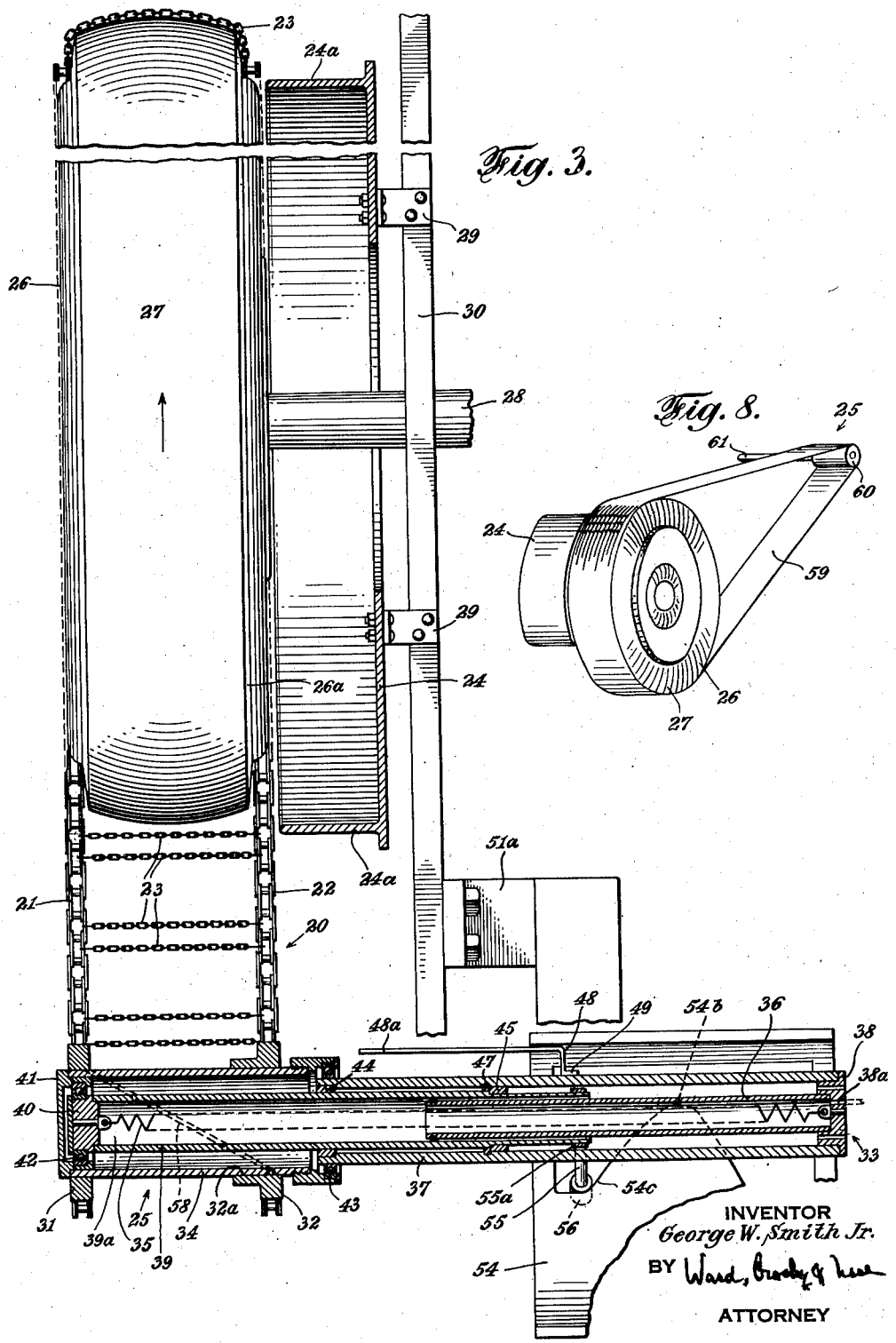
INVENTOR
George W. Smith Jr.
BY Ward, Brady & Lee
ATTORNEY June 28, 1949.　　　　G. W. SMITH, JR　　　　2,474,640
VEHICLE TRACTION DEVICE
Filed Aug. 1, 1946　　　　　　　　　　4 Sheets-Sheet 4
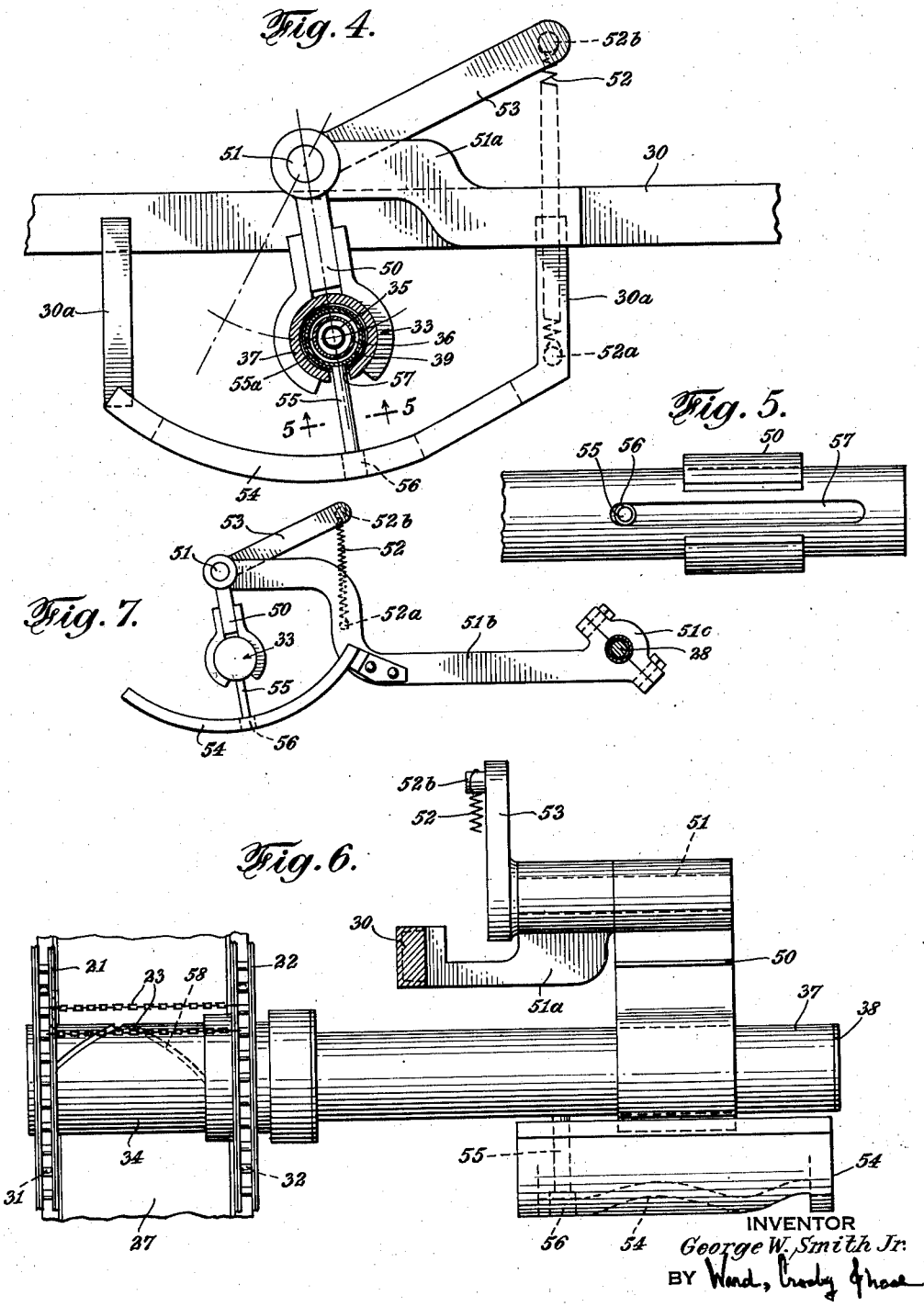

Patented June 28, 1949

2,474,640

UNITED STATES PATENT OFFICE 2,474,640

VEHICLE TRACTION DEVICE

George W. Smith, Jr., Greenwich, Conn., assignor of one-half to Eric W. Wood, Syosset, N. Y.

Application August 1, 1946, Serial No. 687,736

17 Claims. (Cl. 152—214)

This invention relates to traction apparatus, and more particularly to a device for preventing the skidding of motor vehicles, which device if desired may be operated by the driver of a vehicle without leaving a driving position and with the vehicle in motion.

Traction devices which have been heretofore proposed for motor vehicles normally have required manual installation upon the tires of the vehicle with considerable personal inconvenience. This usually involves applying non-skid chains or the like to the periphery of the wheels usually making it necessary to lift or jack the wheels above the surface of the road. This, of course, must be done while the vehicle is stopped.

Traction apparatus or skid-preventing devices previously employed are normally subject to extreme abrasion and wear when the vehicle passes over hard surfaced pavements such as asphalt or concrete. When pavements are covered with snow or ice, the wear on the chains or traction devices is, of course, minimized. Traction devices usually are subject intermittently to stretches of ice and snow-covered pavement and to stretches of pavement which are not so covered. It is impractical to remove the non-skid devices heretofore proposed from the wheels of the vehicle every time a stretch of pavement is encountered which is clear of snow or ice. Consequently, serious wear upon these types of non-skid devices occurs.

This serious wear occurs also in those instances where there is no snow or ice but only water on the pavements. It is very likely that when the pavements are only wet, the necessity for a non-skid or a traction device will arise only during a small percentage of the time of travel. It is, of course, impractical at short intervals intermittently to remove and apply tire chains or other traction devices of types heretofore proposed. Consequently, such devices may not be continuously used during, for example, a period of wet weather without consequent serious wear above mentioned.

Not only is the chain subject to surface wear under the above conditions but the tire of the vehicle is subject to similar wear whenever non-skid devices are applied.

Traction apparatus previously proposed also have been unable to provide satisfactory non-skid qualities with respect to lateral motion of the vehicle.

Furthermore, non-skid or traction devices heretofore employed have failed to provide rapidly operable means for applying same while the vehicle is in motion and when, for example, the skidding of the vehicle is imminent or has already started.

According to the present invention, an apparatus is provided which will eliminate the above difficulties or reduce them to insignificance.

Various further and more specific objects, features and advantages of the invention will clearly appear from the detailed description given below taken in connection with the accompanying drawings which form a part of the specification and illustrate, by way of example, preferred arrangements of apparatus for carrying out the invention. The invention consists in such novel combinations of features as may be shown and described in connection with the equipment herein disclosed.

In the drawings:

Fig. 1 is a plan view, partly in section and with parts broken away, showing one embodiment of the present invention in an inactive position;

Fig. 2 is a side elevation partly in section of the parts shown in Fig. 1;

Fig. 3 is a plan view partly in section and with parts broken away of the embodiment shown in Fig. 1 in an active position;

Fig. 4 is a side elevation partly in section illustrating means for mounting traction member supporting means, said means being mounted upon the frame of a vehicle;

Fig. 5 is a view taken along line 5—5 of Fig. 4;

Fig. 6 is a rear elevation of certain of parts shown in Fig. 3 in cooperation with the parts shown in Fig. 4;

Fig. 7 is a side elevation of traction member support means mounted upon the shaft of a vehicle wheel rather than upon the frame of said vehicle shown in Fig. 4; and Fig. 8 is an isometric view of a second embodiment of the present invention.

In the forms shown in the drawings the novel traction device is constituted by means for shifting a flexible traction member, such as an endless belt or chain, from an inactive position upon a support member adjacent a vehicle wheel, to an active position over the periphery of said wheel. Thus traction upon a slippery road surface may be obtained. The shifting of the traction member is accomplished while the vehicle is in motion and includes movement not only from said inactive to said active positions but also the reverse thereof, and is effected by associating the traction member with one or more suitable lateral guide members, such as flanged rollers for a belt or sprockets for a sprocket chain. A lateral thrust exerted upon the guide members is communicated to the traction member to accomplish said shifting of positions. The lateral guide members may be governed, for example, from the dashboard or control panel of the vehicle.

Referring to the drawings in further detail, the novel traction device comprises, for example, a longitudinally flexible but laterally stiffened endless traction member 20 which, in the form shown in Figs. 1–3 and 6, is constituted by a pair of sprocket chains 21, 22 having suitable cross links 23. Instead of a sprocket chain any suitable traction member may be employed such as a belt. A form of the latter will be described later in connection with a second embodiment of the invention (Fig. 8). The lateral rigidity or stiffness of the traction member is not a prerequisite of successful operation of the invention.

The traction member 20 comprises in effect an endless belt which is operatively associated at all times with one or more lateral guide members. The latter are capable of urging said traction member alternatively into engagement with a vehicle wheel whereby it is trained over a portion of the periphery of the wheel, or into engagement with a support member mounted adjacent the wheel. The combined action of the rotational motion of said wheel and the lateral thrust upon the traction member, as exerted by said guide, is effective to train the traction member over the wheel or to disengage same therefrom and move the traction member onto the adjacent support.

In the form shown in Fig. 1 the apparatus is illustrated in an inactive position, and is constituted by said traction member 20 which is resting upon a support member 24 having a periphery 24a and is trained about a suitable lateral guide member 25. Support member 24 may be designated as a drum or apron and is so constructed and arranged adjacent a vehicle wheel 26 that a large portion of the periphery 24a is adjacent the periphery of the wheel 26. The latter may have a suitable pneumatic tire 27 mounted thereon.

In the form shown in Fig. 2 about 160° of the periphery of apron 24 is adjacent the periphery of tire 27. As will appear hereinafter it is desirable for the radius of that portion of the periphery of the apron 24 which is adjacent the periphery of wheel 26 to be somewhat less than the wheel radius in order to facilitate transition of the traction member from tire to apron and vice versa.

As shown in Fig. 2 a lower periphery or portion 24b of the apron is flattened to avoid obstructions in the road and to avoid resting the weight of the vehicle upon the apron when the tire 27 is deflated. It is thus highly desirable but not entirely necessary that this lower portion be so flattened. As a result the flattened portion 24b of apron 24 is not adjacent the tire periphery.

The apron or drum 24 as shown in Figs. 1–3 is associated with a rear wheel 26 of a vehicle. This wheel normally is not angularly shifted to effect a steering action. Thus the peripheries of the tire 27 and the apron are at all times substantially parallel. In describing the relative positions of wheel 26 and apron 24 it may be specified that the plane of the wheel and of the apron are substantially parallel. The term "the plane of the wheel 26" normally refers to a plane passing through the wheel and perpendicular to a shaft 28 for said wheel. The term "the plane of the drum or apron 24" normally refers to a plane thereof as shown in Fig. 2 (plane of the paper). Thus the apron 24 may be mounted rigidly by means, for example, of brackets 29 upon a frame 30 of the vehicle to hold said planes parallel.

It was mentioned above that the radius of the support member or apron 24 is "somewhat less" than that of the tire or wheel in that peripheral portion of the apron which is adjacent the wheel periphery. It is desirable that, of these two members, the wheel and the apron, the rotating member have the longer radius. In the embodiments illustrated herein the apron is not adapted for angular movement and hence is preferably the smaller in radius. However, if the support member 24 were adapted for angular movement it is possible for it to have a radius at least equal to that of the wheel. Under such conditions a transition of the traction member 20 from tire to support member and vice versa could occur with the aid of said angular movement of the support member. As a general rule, and as will appear more fully hereinafter, it is the rotation or angular movement of the vehicle wheel which causes it to entrain the traction member. This occurs in cooperation with a lateral thrust applied to said traction member, which causes the latter to move off of the smaller stationary apron onto the wheel. Also it is said rotation plus lateral thrust which disengages the traction member from the wheel and lays it back upon the apron.

The traction member 20, as above described, comprises for example the sprocket chains 21, 22 which are interconnected by a plurality of cross links 23. The sprocket chains 21, 22 constitute the longitudinal portions of this particular type of traction member, and because they may be associated with a substantial portion of the circumference of the wheel 26 when in an active position they are sometimes referred to as "circumferential chains" or "circumferential members." They may also be designated as "longitudinal traction members" or "longitudinal chains," and the cross links 23 may be designated as "lateral traction members" or "lateral chains."

The longitudinal traction members 21, 22, being sprocket chains, are longitudinally flexible but are laterally substantially stiff, that is, they have a substantial lateral rigidity. A lateral thrust applied to one portion thereof will be communicated to all parts thereof. This is true of a sprocket chain when lying, for example, with two free extremities and in a single plane. It is especially true of a sprocket chain having said extremities joined (an "endless" chain) and passing over suitable sprockets therefor.

The lateral guide member 25 comprises in the embodiment shown (Figs. 1–3, and 6) a pair of sprockets 31 and 32 having suitable teeth which mesh respectively with chains 21 and 22, and which are mounted upon a suitable rotatable lateral guide shaft 33 in spaced relation to the shaft 28.

As shown in Fig. 2 the wheel 26 may be mounted within a fender 28a having a rear portion 28b. The latter may be streamlined and is normally hollow providing a suitable chamber within which the guide member 25 and its related means may be mounted (Fig. 2).

The lateral guide shaft 33 is so constructed and arranged in the form shown (Figs. 1, 3–6) that the lateral guide members may be shifted axially thereupon alternatively into alignment with the plane of the apron 24 or the plane of the wheel 26. When the wheel 26 is rotating in the direction indicated by arrow (Figs. 1, 2, 3), that is, when the vehicle is in motion, and when said lateral guide members are so shifted axially of the shaft thereof from alignment with the apron to alignment with the wheel, the combined action of the rotation of the wheel and the lateral thrust communicated to the traction member will cause the latter to be entrained by the wheel 26 initially at a point in the neighborhood of 26a (Figs. 1-3). Since the lateral guide member 25 is freely rotatable the chains 21, 22 will be shifted to the left (Fig. 1) and pulled from their inactive position (Fig. 1) around the forward portion of the wheels, as shown in solid lines in Fig. 2, to an active position (Figs. 2 and 3).

The lateral guide shaft 33 may take many forms, but in the embodiment illustrated it is constituted by a group of telescopically engaged cylinders upon one of which may be mounted the sprockets or lateral guide members 31, 32. The particular cylinder upon which the sprockets are mounted may be designated the sprocket cylinder or sprocket shaft 34. Sprocket 31 is preferably rigidly mounted upon sprocket cylinder 34, and sprocket 32 is slidably mounted thereon for a purpose to appear later. The group of cylinders is so constructed and arranged that, by means of for example fluid pressure, such as oil pressure, they may be made to expand longitudinally in the manner of a telescope, thereby shifting the sprocket cylinder axially from an inactive position as shown in Fig. 1 to an active position shown in Fig. 3.

Suitable resilient means such as a coil spring located, for example, centrally thereof may be employed for urging the cylinders into a nested or inactive position as shown in Fig. 1. The spring 35, of course, is effective to nest the cylinders in the absence of said fluid pressure.

The group of telescoping cylinders comprise a pair of concentric relatively stationary cylinders 36 and 37 rigidly mounted upon a base plate 38. Cylinder 36 is mounted within cylinder 37. A second pair of concentrically associated cylinders 39 and 34 is provided, the latter of which surrounds the former and constitutes the above mentioned sprocket cylinder. Cylinders 39, 34 are mounted for axial movement together and are thus both axially shiftable relative to the cylinders 36, 37. Cylinders 36, 37 are open at the left extremities thereof (Figs. 1 and 3). Cylinders 39 and 34 thus are open at the right extremities thereof and are provided respectively with end cover plates 40 and 41.

The nesting spring 35 may be attached at opposite extremities thereof to the base plates 38 and 40. A suitable fluid orifice 38a may be provided as a passage for the actuating medium such as oil.

The pair of cylinders 39, 34 is so spaced relative to pair 36, 37 that when the two pairs are telescopically engaged the cylinder 37 is slidable between the cylinders 39, 34, that is, cylinder 39 may surround cylinder 36 and is slidable within cylinder 37. Also, the sprocket cylinder 34 is adapted for surrounding the relatively stationary cylinder 37 and for moving axially relative thereto.

The internal portion of cylinder 39 is designated as 39a and constitutes a chamber in which fluid under pressure may be led to expand telescopically the cylinders comprising said lateral guide shaft.

Sprockets 31, 32 may be mounted for rotation with the sprocket cylinder 34. Hence it is desirable to mount said cylinder upon suitable bearings for rotation, for example, relative to the other cylinders of the group. For this purpose bearings 42 and 43 are provided respectively at the left and right hand extremities of the sprocket cylinder (Figs. 1 and 3). Bearing 42 is interposed preferably between the end cover plate 40 of cylinder 39 and the left extremity (Fig. 1) of sprocket cylinder 34. Bearing 43 may be attached to the right extremity (Fig. 1) of sprocket cylinder 34 and may slidably engage the cylinder 37. Thus the sprocket cylinder 34 is jointly supported by cylinders 37 and 39.

The bearing 42 is of such a nature that it may communicate a thrust therethrough, in a manner to appear later, from the cylinder 39 to the sprocket cylinder 34.

The inner cylinder 39 of the axially shiftable pair 39, 34, is held in slidable but rigidly coaxial relationship to the relatively stationary pair of cylinders 36, 37 by means of a pair of annular portions or journals 44 and 45 (Figs. 1 and 3). Journal 44 is mounted at the open extremity of and upon cylinder 37 and interposed between the cylinders 37 and 39. Journal 45 is mounted upon the cylinder 39 adjacent its open extremity.

A third journal or annular portion 46 may be provided for assisting in maintaining said coaxial relation and for providing a fluid seal for a purpose to appear later. Said journal 46 may be rigidly mounted upon the inner relatively fixed cylinder 36 adjacent the free extremity thereof and interposed between cylinders 36 and 39.

Suitable means may be provided for limiting the axial motion of the lateral guide member 25 to the left, as viewed in Figs. 1 and 3, comprising, for example, a ring 47 which may be mounted within a suitable annular groove formed in the inner surface of cylinder 37 and thus adapted for engagement with the journal 45 (Fig. 3) when the telescopically engaged cylinders are in an extended condition. Ring 47 is so positioned within cylinder 37 that when journal 45 is in contact therewith the lateral guide member 25 (sprockets 31, 32) is in its active position in operative alignment with the wheel 26.

A limit stop for limiting the axial motion of said lateral guide member 25 to the right (as viewed in Fig. 1) may be provided and is constituted in the embodiment of said Fig. 1, for example, by a limit-stop arm 48 which is preferably rigidly attached to the relatively fixed cylinder 37 at a point 49, which is not within the path of axial motion of the sprocket cylinder 34. The limit-stop arm 48 is provided with a finger 48a which may extend longitudinally of the lateral guide shaft 33 to a predetermined point where it may be engageable by the sprocket 32. The limitation upon the axial movement of sprocket 32 limits said axial motion of the lateral guide member 25 to the right by a desired amount in a manner to appear more fully hereinafter.

Novel means are provided for controlling the tension upon the traction member 25:

(1) When it is in an inactive position as shown in Fig. 1;

(2) When it is in an active position as shown in Fig. 3; and (3) When it is in transition between the above two positions.

Said novel means are constituted in the form shown (Figs. 1, 3-7), for example, by means for resiliently urging the lateral guide member 25

(sprockets 31, 32) away from the wheel 26 when said member is in an inactive position, and by a cam which becomes effective when said guide member shifts axially (or laterally) to vary, in a predetermined manner, the distance between the wheel shaft 28 and the lateral guide shaft 33. This cam also governs the distance between said shafts when the lateral guide member is in an active position as shown in Fig. 3. The resilient means, above mentioned, are employed, in the form shown, to maintain an operative association between said cam and lateral guide member during said axial shifting, and also when said lateral guide member is in its active position (Fig. 3).

Thus by governing the distance between the axes of shafts 28 and 33 as a function of axial displacement of the lateral guide member 25, the tension upon the traction member may be controlled.

Said novel tension control means for the traction member may be constituted by:

(1) Means for resiliently urging the lateral guide shaft 33 away from the wheel 26 and apron 24 at all times, for example, by mounting lateral guide shaft 33 upon a pivoted arm 50 (Fig. 4) angularly shiftable about a shaft 51 mounted on frame 30 by means of a bracket 51a, and yieldingly urging said arm 50 away from said wheel and apron by a spring 52 which may be attached at one extremity 52a thereof to the frame 30 and at the other extremity 52b to an arm 53 which, for example, may be rigidly attached to arm 50.

(2) A relatively fixed cam 54, which acts in conjunction with said spring 52 whereby the lateral guide shaft is held in operative association with the cam during certain phases of the operation thereof. Cam 54 may be mounted on frame 30 by arms 30a (Fig. 4) and is operatively associated with the lateral guide shaft 33 by means of a follower mounted on said shaft having a follower finger 55 with a follower roller 56. Follower finger 55 is mounted for axial movement with the lateral guide member (sprockets 31, 32). It should be noted that the full resilient effect of the spring 52 is preferably exerted upon the lateral guide shaft when the apparatus is in its inactive position (Fig. 1). This will be more fully explained later and is because the follower finger 55 may be axially shifted, when in this position, to a point where it no longer is in contact with the cam 54 (Fig. 1) thus giving spring 52 full effect.

If it is desired the bracket 51a need not be rigidly attached to frame 30 as shown in Fig. 4 but may be in the form 51b as illustrated in Fig. 7 which is removably attached by suitable clamping members 51c to a stationary sleeve surrounding shaft 28. Cam 54 may be rigidly attached to bracket 51b.

The cam 54 thus is followed by the lateral guide shaft 33 (sprocket shaft or cylinder 34) in such a manner that the distance between said lateral guide shaft and the wheel 26 is a function of the axial or lateral movement of the sprockets, of course, as influenced by the contour of the cam 54.

The cam follower finger 55 preferably is rigidly attached to the cylinder 39 adjacent the right extremity thereof (Figs. 1 and 3) by means of a suitable ring 55a which may surround cylinder 39. Since the latter is mounted within the cylinder 37 a suitable slot 57 (Figs. 4 and 5) is provided in said cylinder 37 through which the finger 55 may extend and may move axially.

Thus axial motion of the cam follower 55 as it progresses along the slot 57 is translated into angular movement of the lateral guide shaft 33 about the pivot shaft 51, and thus the distance is controlled between shaft 28 and the sprockets.

The cam 54 is provided with a deep valley 54a at the portion thereof corresponding to the inactive position of the traction member, a peak 54b at the portion corresponding to the "changeover" or transition of the traction member from wheel to support and vice versa, and a second valley 54c at that portion corresponding to the active position of the traction member.

In view of the greater axial distance between shaft 28 and sprockets 31, 32 when the traction member is inactive as compared to said distance when the traction member is active, the valley 54a is of greater depth than valley 54c. As mentioned above the depth of valley 54a may be such that the follower roller 56 does not contact the cam surface when the traction member is in its inactive position (Fig. 1). The traction member itself may hold the cam follower from touching the cam when said follower is in its extreme right hand position as shown in Fig. 1.

As shown in Fig. 2 the sprockets preferably may be moved away from the shaft 28 to take up the slack in the chain when it engages the apron 24. The slack occurs because said support is not of so large a circumference as the wheel 24. When the chain is engaged upon the vehicle wheel the sprockets preferably will assume the position shown in solid lines in Fig. 2, and when the chain is in an inactive position and thus at rest upon the support member 24 the sprockets preferably will take the position shown in broken lines (Fig. 2) whereby the chain is held snugly against the support member to minimize rattling and to provide safe stowage therefor.

As above explained, the traction member in the embodiment of Fig. 1 is constituted by a pair of parallel circumferential chains 21 and 22 which are interconnected by cross links 23. The length of the cross links 23, of course, must be sufficient to extend over the crown of the wheel 26 as shown in Fig. 1. Consequently, the cross links are of appreciable length. It is impractical to support the sprocket chain means or traction member in an inactive position with the cross links thereof as shown in Fig. 3 perpendicular to the circumferential chains 21, 22 because (1) an excessive amount of space would be required, and (2) also the cross links 23 if supported in such a perpendicular position would have a strong tendency to rattle continuously as the vehicle moves over a road. Consequently, novel means are provided for moving said circumferential chains longitudinally relative to one another whereby the cross links 23 take the position as shown in Fig. 1. This relative longitudinal motion of the circumferential chains occurs simultaneously with:

(1) Axial or lateral motion of the sprockets 31 and 32; and (2) Axial motion of said sprockets relative to one another whereby they are brought into and out of the close relation as shown in Fig. 1. Sprocket 32 is thus in slidable engagement with sprocket cylinder 34.

The relative longitudinal motion of the circumferential chains 21 and 22 is accomplished by, for example, angularly shifting the sprocket 32 relative to sprocket 31 by a predetermined angular amount. This relative angular movement of the sprockets occurs in response to movement of the sprockets 31 and 32 relative to their axis.

In order to accomplish the above mentioned relative angular movement of the sprockets 31 and 32, a helical spline 58 may be provided in relief upon the sprocket cylinder 24 in the nature of a screw thread, and may cooperate with a suitable groove formed within an internal surface 32a (Fig. 3) of sprocket 32.

A second embodiment of the invention is shown in Fig. 8 wherein the traction member comprises a belt 59 which, for example, may be a sprocket belt sometimes referred to as a "silent chain belt." This type of belt may be provided with teeth on both sides thereof in order that it may obtain traction upon a roadway and have a positive toothed engagement with a lateral guide member 60. This type of belt also is sometimes referred to as a "duplex" belt.

The lateral guide member, of course, preferably is in the form of a sprocket wheel which may cooperate with sprocket teeth provided on the inner surface of the belt.

In view of the increased effectiveness of a duplex belt or traction member to prevent lateral skidding this type of traction member is highly desirable. The type of traction member having cross links, such as 23 (Fig. 3), is effective against longitudinal skidding but not so effective against lateral skidding as a traction member such as 59.

The lateral guide member 60 is adapted for exerting a lateral thrust upon the traction member 59 in a manner analogous to the lateral guide member described in connection with the first embodiment.

The lateral guide member 60 may be axially shifted upon a shaft 61 to provide said lateral thrust or it may be angularly shifted about an axis perpendicular to its normal axis, that is, the lateral guide member instead of being shifted axially to urge the belt to its extreme positions, may be angularly shifted about a vertical axis as viewed in Fig. 8. A sufficient lateral thrust can be achieved by the latter method for the shifting of said traction member.

Tension control means for the embodiment of Fig. 8 may be provided which are analogous to that used in the embodiment first described.

While the lateral rigidity of the traction members described above have been employed to facilitate the shifting of said members off of the support member and onto the vehicle wheel and vice versa, the traction member may be so shifted if it does not have this quality.

In the operation of the first embodiment, the initial or inactive position of the apparatus is shown in Fig. 1 wherein the lateral guide member 25 (sprockets 31, 32) is in alignment with the traction support member 24. The sprockets 31 and 32, as shown in Fig. 1, are in adjacent relationship whereby the sprocket chains 21 and 22 are brought relatively close to one another as compared to their position as shown in Fig. 3. The sprockets 31 and 32 have, in this position, been shifted angularly relative to one another whereby the cross links 23 have been drawn taut by virtue of the relative longitudinal movement of the circumferential chains 21 and 22.

The traction member, of course, is laid over the apron or support member 24 and over the lateral guide member (sprockets 31, 32) in the manner of an endless belt as shown in dotted lines in Fig. 2.

The traction member is held taut by virtue of the spring 52 (Fig. 4) which forcefully but resiliently urges the lateral guide shaft 33 in a clockwise direction as viewed in Fig. 4, or in a direction away from the apron 24 as viewed in Fig. 1. The cam follower roller 56, preferably, is not in engagement with the surface of a cam 54 when the apparatus is in the position shown in Fig. 1, that is, when the lateral guide member is in its extreme (inactive) position in alignment with the traction support member or apron 24. Said follower 56 preferably is in the neighborhood of the valley 54a but is positioned far enough to the right (Fig. 1) so that it does not contact the cam. Thus, the spring 52 (Fig. 4) alone is effective to control the tension upon the traction member.

When it is desired to place the traction member 20 over the vehicle wheel 26 while the vehicle is in motion, for example, when skidding seems imminent or when snow or ice covers the roadway, a suitable manually operable control valve for the fluid actuatable lateral guide shaft 33 may be moved by hand, for example, from the dashboard of the vehicle whereby oil under pressure is directed to the chamber 39a of the cylinder 39 by way of an orifice 38a in the base plate 38. This fluid under pressure acts against the internal surface of the base plate 40 and communicates a thrust thereto which overcomes the influence of the spring 35. This thrust is communicated to the sprocket cylinder 34 through the intermediary of the bearing 42. Thus, the sprocket cylinder 34 is urged to the left as viewed in Fig. 1 and the bearing 43 slidably moves over the cylinder 31 as the sprocket cylinder moves toward its active position as shown in Fig. 3.

As the lateral guide member 25 is axially shifted, that is, as the sprocket cylinder 34 and the cylinder 39 are moved axially to the left under the influence of hydraulic or fluid pressure, the following occurs:

(1) The cam follower roller 56 is urged to the left and strikes the stationary cam 54 in the neighborhood of the floor of the valley 54a. The point of contact preferably is upon an upward slope of said valley. The coaction of the cam 54 and the cam follower causes the lateral guide member 33 to be moved in a counterclockwise direction as viewed in Fig. 4 or in the direction of the wheel as viewed in Fig. 1. This movement relieves the tension upon the traction member 20 and prepares same for the "change-over" to the tire 37.

(2) Concurrent with the change in the tension upon the traction member 20, there occurs a spreading apart of the sprockets 31 and 32. That is, said sprockets are moved axially away from one another. This is accomplished simultaneously with the angular shifting of said sprockets into phase with one another whereby the cross links 23 are moved from their slanted positions relative to the circumferential chains 21, 22, to a perpendicular relation with said chains. Friction tends to hold the chain 22 in its initial position as shown in Fig. 1. Thus, the chain 22 tends laterally to restrain the sprocket 32 in its inactive position as shown in Fig. 1. In other words, the laterally rigid chain 22 tends to hold the sprocket 32 in its inactive position (Fig. 1). This restraining action exercised by chain 22 coacts with the axial movement of sprocket cylinder 34 to the left (Fig. 1) to cause a relative angular motion of sprocket 32, the sprocket cylinder 34 and sprocket 31 by virtue of the action of the spline 58. This relative combined angular and axial movement of the sprocket 32 relative to sprocket 31 continues until sprocket 32 has reached the limit of its axial motion relative to cylinder 34 and has assumed the position as shown in Fig. 3.

(3) It is assumed that the vehicle is in motion and that the wheel 26 is rotating in the direction of the arrows shown in Figs. 1, 2 and 3. The lateral or axial motion of the lateral guide member 25 exerts a lateral thrust concurrently upon the chains 21 and 22 by virtue of the lateral rigidity or stiffness of said chains and by virtue of the meshing association thereof with the sprockets 31 and 32. As the tension upon the traction member 20 is diminished by the action of the cam 54, the lateral shifting of the circumferential chains 21 and 22 is facilitated and they are shifted to the left as viewed in Fig. 1 to a point where the outboard chain 21 is brought into contact with the rotating wheel 26 in the neighborhood or area 26a. The combined action of the rotating wheel 26 and the laterally moving traction member or chains 21, 22, causes the tire 27 to entrain the traction member and to pull same over and around the tire to the position shown in solid lines in Fig. 2. A similar entraining action will occur wthout said lateral rigidity.

(4) The transition of the traction member from the apron 24 to the tire 27 may occur when the cam follower roller 56 is slightly short of the peak 54b of the cam 54. During the movement of the traction member over the tire 27, the cam follower roller 56 moves from the peak 54b, or the point of least tension upon the traction member, down into the valley 54c whereby the tension upon the traction member is increased by a predetermined extent. Thus, during the change-over of the traction member from its inactive to its active position, the tension thereupon is governed by the cam 54, and the lateral guide member is held in operative association therewith by means of the spring 52. When the apparatus is in its active position as shown in Fig. 3, the cam follower roller 56 has reached the floor of the valley 54c and the lateral guide shaft 33 and the lateral guide member 25 is in the position shown in solid lines in Fig. 2. As above mentioned, the conformation of the cam 54 is such that the valley 54a may be considerably deeper than 54c with the result that the extent of the angular motion of the lateral guide shaft 33 about the pivot shaft 51 is not as great from peak 54b to valley 54c as it is from peak 54b to valley 54a.

The reversal of the above cycle of operation occurs when fluid pressure is removed from the chamber 39a and the spring 35 forces the cylinders comprising the lateral guide shaft into a nested position as shown in Fig. 1. As the sprocket cylinder 34 is urged, to the right as viewed in Fig. 3 by the spring 35, the sprocket 32 will engage the limit stop finger 48a and will arrest the axial movement thereof, thus causing a simultaneous relative angular movement of the two sprockets and a relative axial movement whereby said sprockets are brought adjacent one another as shown in Fig. 1. The circumferential chains 21, 22 thus are shifted longitudinally relative to one another and the cross links 23 are pulled taut.

As the lateral guide member 25 is shifted back to its inactive position (Fig. 1) the coaction of the rotation of the wheel 26 and lateral thrust to the right as viewed in Fig. 1, will cause the traction member to be disengaged or pulled from the rotating wheel back onto the apron or supporting member 24.

The operation of the embodiment as shown in Fig. 8 is analogous to that of the embodiment first described with the exception that it is not necessary in this second embodiment to provide for hauling taut on the cross links 23 nor is it necessary to move the circumferential chains longitudinally relative to one another. This, of course, is obvious in view of the nature of the traction member 59.

The lateral guide member 60 may be shifted axially upon the shaft 33 to move the traction member 59 from its inactive to its active positions, and vice versa. As an alternative, the lateral guide member 60, instead of being shifted axially upon lateral guide shaft 33, may be shifted angularly about an axis which is vertical as viewed in Fig. 8 and which passes, for example, through the mid portion of the lateral guide member 60. A lateral thrust may be obtained by such angular shifting of the guide member 60 which will accomplish the same result as the axial shifting of said guide member.

It will be noted that the apparatus is of such shape and dimensions that it may all be readily housed and substantially concealed from view by the mudguard of the vehicle and adjacent body portions. That is, the operating mechanism and the portions of the traction chains or belt which extend around the sprockets, can conveniently be made so as to occupy the space within the rearwardly extending portion 28b of a rear mudguard of conventional shape as now used on most passenger automobiles, and the support 24 for the chain or belt while in inactive position may conveniently be located just inside the vehicle wheel in a region which will be concealed by the forward portions 28a of the mudguard. Due to the fact that the two sides of the traction chain as shown in Fig. 1 may be brought into close proximity when in inactive position, the width of the support 24 does not need to be great enough to interfere with the vehicle springs or other mechanism which may be located adjacent the wheel. If desired, a portion of the hot exhaust gases from the vehicle engine may be conveniently directed into the rear portion of the mudguard, thereby preventing the formation of ice which would interfere with operation of the mechanism.

While the invention has been described with respect to preferred embodiments, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In a traction device for vehicles, a support for a traction member, an endless traction member, an idler roller for said member, adapted for shifting said member laterally, means for moving said idler roller laterally with respect to the plane of a wheel of the vehicle whereby said traction member is alternatively engaged with said wheel or said support, and means for controlling the lateral movement of said idler roller from a remote point.

2. In a traction device for a vehicle wheel, a support for a traction member mounted adjacent said wheel, a laterally stiff endless traction member, a guide member operatively associated with said traction member and mounted in spaced relation to said wheel and said support, and means for axially shifting said guide member alternatively into alignment with the plane of said wheel and said support, said traction member adapted alternatively for passing over said wheel and said support in response to said lateral movement of said guide member and while the vehicle is in motion.

3. In a traction device for vehicles, an endless traction member, a lateral guide member operatively associated with said traction member, a support member for said traction member mounted adjacent a vehicle wheel, said endless traction member when in an inactive position passing around said support member, and means for moving said lateral guide member to shift said traction member alternatively off of said support and onto said wheel or off the wheel and onto said support.

4. In a traction device for a vehicle, an endless traction member, a guide member operatively associated with the traction member, a support member for said traction member mounted adjacent a vehicle wheel, said traction member when in an inactive position passing around said support member, and means for moving said guide member relative to said wheel and support for alternatively leading said traction member off of said wheel and onto said support or off of said support and onto the wheel.

5. In a traction device for a vehicle wheel, a belt engaging said wheel and having a surface adapted for traction on slippery road surfaces, and separate guide means over which said belt passes for restraining the belt from lateral motion out of engagement with the periphery of said wheel.

6. In a traction device, a traction belt support, an endless traction belt adapted for engagement alternatively with a vehicle wheel and said belt support, said belt having lateral rigidity, separate guide means for said belt for controlling lateral movement thereof, means for moving said guide means laterally with respect to the plane of said wheel for engaging said belt alternatively with said wheel or said belt support, and means for controlling said last-named means from a remote point.

7. In a traction device for vehicles, the combination with a wheel of said vehicle, of a traction member, one or more lateral motion guide members for said member, and support means for said traction member mounted stationarily relative to and adjacent said wheel, said traction member passing over said lateral guide members and adapted for alternatively engaging said wheel or said support means in response to lateral movement of said guide members into and out of alignment respectively with said wheel or support means.

8. A traction device comprising, a laterally rigid endless traction member adapted for engagement with a vehicle wheel, separate guide means for said member adapted for exerting a lateral thrust thereupon in the direction of motion of said guide means, and support means for said traction means mounted adjacent said wheel, said traction member being adapted for being trained off of said wheel onto said support means and off of said support means onto said wheel in response to lateral thrusts upon said traction member by said guide means.

9. In a traction device for a vehicle wheel, traction belt support means mounted adjacent said wheel, laterally stiff endless traction belt means, a rotatable guide member for said traction belt means adapted for controlling the lateral motion of said belt means, and means for laterally shifting said guide member whereby the lateral position of said belt means is controlled, said belt being adapted for engaging alternatively said wheel or said support means while the vehicle is in motion in response to lateral movement of said guide member alternatively into alignment with said wheel or said belt support means.

10. A traction device for a vehicle wheel comprising, chain support means, endless sprocket chain means adapted to be engaged alternatively with said wheel and said support means, and separate sprocket guide means supporting said chain means for movement in the direction of its length, said sprocket guide means being movable laterally with respect to the plane of said wheel to engage said sprocket chain means alternatively with said wheel or said support means.

11. In a traction device for a vehicle wheel, belt support means mounted adjacent said wheel, an endless non-skid belt, and a guide roller operatively associated with said belt and mounted in spaced relation to said wheel and belt support means, said belt being adapted for engaging alternatively said wheel or said support means in response to lateral movement of said guide roller relative to the plane of said wheel.

12. In a traction device for a vehicle wheel, sprocket means, a supporting shaft for said sprocket means, endless sprocket chain means trained about said sprocket means and said wheel, chain support means mounted adjacent said wheel for supporting said chain means when disengaged from the wheel, and means for moving said sprocket means axially of said shaft with respect to said wheel to move said chain means alternatively off of said wheel and onto said support means and off of said support means onto said wheel.

13. The combination with a vehicle traction wheel, of chain support means adjacent said wheel, a chain roller guide mounted in spaced relation to said wheel and support means, an endless traction chain engaged with said wheel and said roller guide, and means for moving said roller guide with respect to said wheel for alternatively engaging said chain with said wheel or said chain support means.

14. In apparatus of the class described, chain support means, a vehicle wheel adjacent said support means, a chain guide member mounted in spaced relation to said wheel and support means and adapted for movement alternatively into alignment with said wheel or said support means, and endless chain means operatively associated with said guide member and adapted for passing alternatively over said wheel or said support means in response to said movement.

15. In apparatus of the class described, chain support means, a vehicle wheel adjacent said support means, a chain guide member mounted in spaced relation to said wheel and support means and adapted for movement alternatively into alignment with said wheel or said support means, and endless chain means mounted upon said guide member and adapted for passing alternatively over said wheel or said support means in response to said movement respectively into alignment with said wheel or said support means.

16. In a traction device for a vehicle wheel, a supporting shaft for a chain guide roller, a chain guide roller mounted on said shaft, an endless chain trained about said roller and said wheel, chain support means mounted adjacent said wheel for supporting said chain when disengaged from the wheel, and means for moving said roller axially on said supporting shaft with respect to said wheel alternatively to move said chain off of said wheel and onto said support or vice versa.

17. In a traction device for a vehicular wheel, an endless traction member, a guide member operatively associated with said traction member, a traction member support mounted alongside said wheel, means for moving said guide member whereby said traction member is alternatively shifted off of said support member and over said wheel or off of said wheel and over said support member, and means for controlling the tension of said traction member.

GEORGE W. SMITH, JR.

REFERENCES CITED

The following references are of record in the file of this patent:

UNITED STATES PATENTS

| Number | Name | Date |
| --- | --- | --- |
| 1,489,963 | Pearre | Apr. 8, 1924 |
| 2,255,178 | Machain | Sept. 9, 1941 |
| 2,273,950 | Galanot | Feb. 24, 1942 |

Certificate of Correction

Patent No. 2,474,640.  June 28, 1949.

GEORGE W. SMITH, Jr.

It is hereby certified that errors appear in the printed specification of the above numbered patent requiring correction as follows:

Column 6, line 6, for the numeral "43", first occurrence, read *42*; column 9, line 6, for "24" read *34*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*